(12) United States Patent
Leppänen et al.

(10) Patent No.: US 7,877,079 B2
(45) Date of Patent: Jan. 25, 2011

(54) METHOD OF AUTHORIZATION FOR A CELLULAR SYSTEM

(75) Inventors: Eva-Maria Leppänen, Tampere (FI); Matti Saarenpää, Tampere (FI); Jukka Aakula, Helsinki (FI)

(73) Assignee: Nokia Corporation, Espoo (FI)

( * ) Notice: Subject to any disclaimer, the term of this patent is extended or adjusted under 35 U.S.C. 154(b) by 534 days.

(21) Appl. No.: 10/986,971

(22) Filed: Nov. 15, 2004

(65) Prior Publication Data
US 2005/0149731 A1 Jul. 7, 2005

(30) Foreign Application Priority Data
Jan. 7, 2004 (GB) .................................. 0400270

(51) Int. Cl.
H04M 1/66 (2006.01)
H04M 1/68 (2006.01)
H04M 3/16 (2006.01)

(52) U.S. Cl. .................... 455/410; 455/411; 455/432.1; 455/418; 455/435.1; 455/432.3; 370/335; 370/229; 370/230; 370/352; 709/204; 709/218; 709/219; 709/223; 713/168

(58) Field of Classification Search .................. 370/329, 370/335–337, 338, 310, 229, 230, 352; 455/414.1, 455/433, 435.2, 410, 411, 418, 432.1, 432.3, 455/435.1; 713/155, 166, 168, 170–175; 709/204, 218, 219, 223
See application file for complete search history.

(56) References Cited

U.S. PATENT DOCUMENTS

| 5,590,175 | A | * | 12/1996 | Gallant et al. ................ 455/433 |
| 5,613,213 | A | * | 3/1997 | Naddell et al. ........... 455/435.2 |
| 5,781,858 | A | * | 7/1998 | Lantto et al. ............. 455/414.1 |
| 6,108,540 | A | * | 8/2000 | Sonti et al. ................ 455/433 |
| 6,256,667 | B1 | * | 7/2001 | Wahlander et al. .......... 709/218 |
| 6,611,684 | B1 | * | 8/2003 | Franks ....................... 455/433 |
| 6,697,620 | B1 | * | 2/2004 | Lamb et al. .............. 455/432.1 |
| 2002/0013827 | A1 | * | 1/2002 | Edstrom et al. ............. 709/219 |

(Continued)

FOREIGN PATENT DOCUMENTS

WO WO98/59480 12/1998

(Continued)

OTHER PUBLICATIONS

3GPP TS 22.240 V2.0.0, Technical Specification Group Services and System Aspects (Stage 1 Service Requirements for the 3GPP GUP) release 6. Mar. 2003, pp. 1-26.*

(Continued)

*Primary Examiner*—Stephen M D'Agosta
(74) *Attorney, Agent, or Firm*—Mintz Levin Cohn Ferris Glovsky and Popeo, P.C.

(57) ABSTRACT

A method and entity of authorising in a communication system are disclosed. The method includes using authorising data to reference other data to define an authorisation associated with the other data. The authorising data includes one of a data component, data group, or data element. Further, a user profile can be provided and includes a user profile data component and an authorisation data component. The authorisation data component or the user profile data component references another authorisation component. Access is authorised to data associated with the user profile data component in accordance with the authorisation data component.

15 Claims, 8 Drawing Sheets

U.S. PATENT DOCUMENTS

| | | |
|---|---|---|
| 2003/0172090 A1 | 9/2003 | Asunmaa et al. |
| 2003/0200313 A1 | 10/2003 | Peterka et al. |
| 2004/0203849 A1 * | 10/2004 | Allison et al. ............ 455/456.1 |

FOREIGN PATENT DOCUMENTS

| | | |
|---|---|---|
| WO | WO 98/59480 | 12/1998 |
| WO | WO01/35670 | 5/2001 |
| WO | WO 01/35670 A2 | 5/2001 |

OTHER PUBLICATIONS

Office Action dated Jan. 29, 2010, issued by the Japanese Patent Office, issued in connection with counterpart Japanese patent application No. 2006-548456.

* cited by examiner

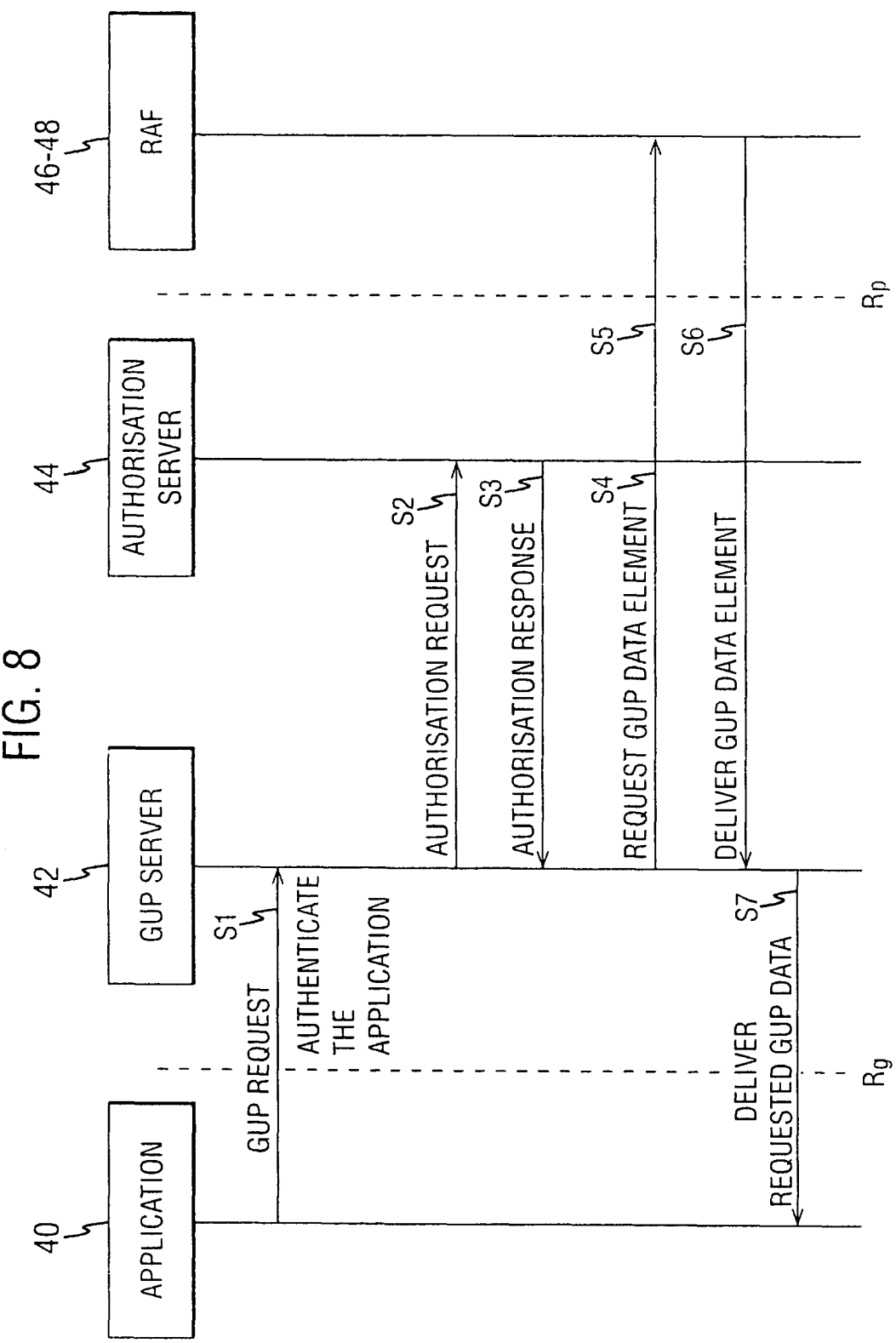

METHOD OF AUTHORIZATION FOR A CELLULAR SYSTEM

FIELD OF THE INVENTION

The present invention relates to a method of authorisation in a communications system.

BACKGROUND OF THE INVENTION

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by fixed line and/or wireless communication interfaces. A feature of wireless communication systems is that they provide mobility for the users thereof. An example of communication systems providing wireless communication is a public land mobile network (PLMN). An example of the fixed line system is a public switched telephone network (PSTN).

A communication system typically operates in accordance with a given standard or specification which sets out what the various elements of a system are permitted to do and how that should be achieved. For example, the standard or specification may define if the user or more precisely user equipment, is provided with a circuit switched server or a packet switched server or both. Communication protocols and/or parameters which should be used for the connection are also typically defined. For example, the manner in which communication is implemented between the user equipment and the elements of the communication networks is typically based on a pre-defined communication protocol. In other words, a specific set of "rules" on which the communication can be based needs to be defined to enable the user equipment to communicate via the communication system.

The introduction of the so called third generation (3G) communication systems will significantly increase the possibilities for accessing services on the Internet via mobile user equipment (UE) as well as other types of UE.

Various user equipment (UE) such as computers (fixed or portable), mobile telephones, personal data assistants or organisers and so on are known to the skilled person and can be used to access the Internet to obtain services. Mobile user equipment referred to as mobile stations can be defined as means capable of communication via a wireless interface with another device such as a base station of a mobile telecommunications network or any other entity.

The term "service" used in this document should be understood to broadly cover any service or goods which a user may desire, require or be provided with. The term will also be understood to cover the provision of complimentary services. In particular, but not exclusively, the term "service" will be understood to include Internet protocol multimedia IM services, conferencing, telephony, gaming, rich call, presence, ecommerce and messaging e.g. instant messaging.

The 3G partnership project (3GPP) is defining a reference architecture for the universal mobile telecommunication system (UMTS) core network which will provide the users of user equipment UE with access to these services. This UMTS core network is divided into three principal domains. These are the circuit switched domain, the packet switched domain and the Internet protocol multimedia (IM) domain.

The IM domain makes sure that multimedia services are adequately managed. The IM domain supports the session initiation protocol (SIP) as developed by the Internet Engineering Task Force (IETF).

In addition, there are several access technologies (GERAN GSM/EDGE radio access network, UTRAN Universal terrestrial radio access network and WLAN wireless local area network).

Since there are several domains and a number of new emerging services within the 3GPP mobile system and access technologies, a generic user profile GUP has been developed to provide a conceptual description to enable harmonised usage of the user related information located in different entities. Examples of services include multimedia messaging MMS, SMS, Chat, telephony, games, browsing/web services, download, e-commerce. This has created a need for a standard user profile management and access.

The GUP is also used in subscription management.

Various aspects of the GUP are defined in the following 3GGP specifications: TS22.240, TS23.240, TS23.241 and TS29.240.

However, the current definition for the GUP does not define any model for authorisation. Authorisation has legal aspects (privacy) and it may easily become much too complicated for the operators and/or end users to manage.

It is therefore an aim of embodiments of the present invention to address these problems.

SUMMARY OF THE INVENTION

According to an aspect of the invention, there is provided a method of authorising in a communications system, said method comprising:

Using authorising data, said authorising data being one of a data component, data group or data element to reference or referenced by other data to define the authorisation associated with said other data.

According to an aspect of the invention, there is provided a method of authorising access to data in a communications system, comprising:

Providing a user profile comprising at least one user profile data component and at least one authorisation data component; and Referencing by one of at least one authorisation data component and at least one user profile data component the other of said at least one authorisation data component and at least one user profile data component; and Authorising access to data associated with at least one user profile data component in accordance with the authorisation data component.

According to an aspect of the invention, there is provided an entity in a communications system, wherein authorising data is arranged to be used, said authorising data being one of a data component, data group or data element to reference other data to define the authorisation associated with said other data.

According to an aspect of the invention, there is provided an entity in a communications system, said entity being arranged to use a user profile comprising at least one user profile data component and at least one authorisation data component, at least one authorisation data component and at least one user profile data component referencing the other of said at least one authorisation data component and at least one user profile data component and said entity having means for authorising access to data associated with at least one user profile data component in accordance with the authorisation data component.

According to an aspect of the invention, there is provided a method of authorising access to data in a communications system, comprising: using a user profile comprising at least one user profile data component and at least one authorisation data component, one of at least one authorisation data component and at least one user profile data component referencing the other of said at least one authorisation data component and at least one user profile data component to authorise access to data associated with at least one user profile data component in accordance with the authorisation data component.

BRIEF DESCRIPTION OF DRAWINGS

For a better understanding of the present invention and as to how the same may be carried into effect, reference will now be made by way of example to the accompanying drawings in which:

FIG. 8 shows the signalling in one embodiment of the invention.

DETAILED DESCRIPTION OF EMBODIMENTS OF THE INVENTION

Figure 1:
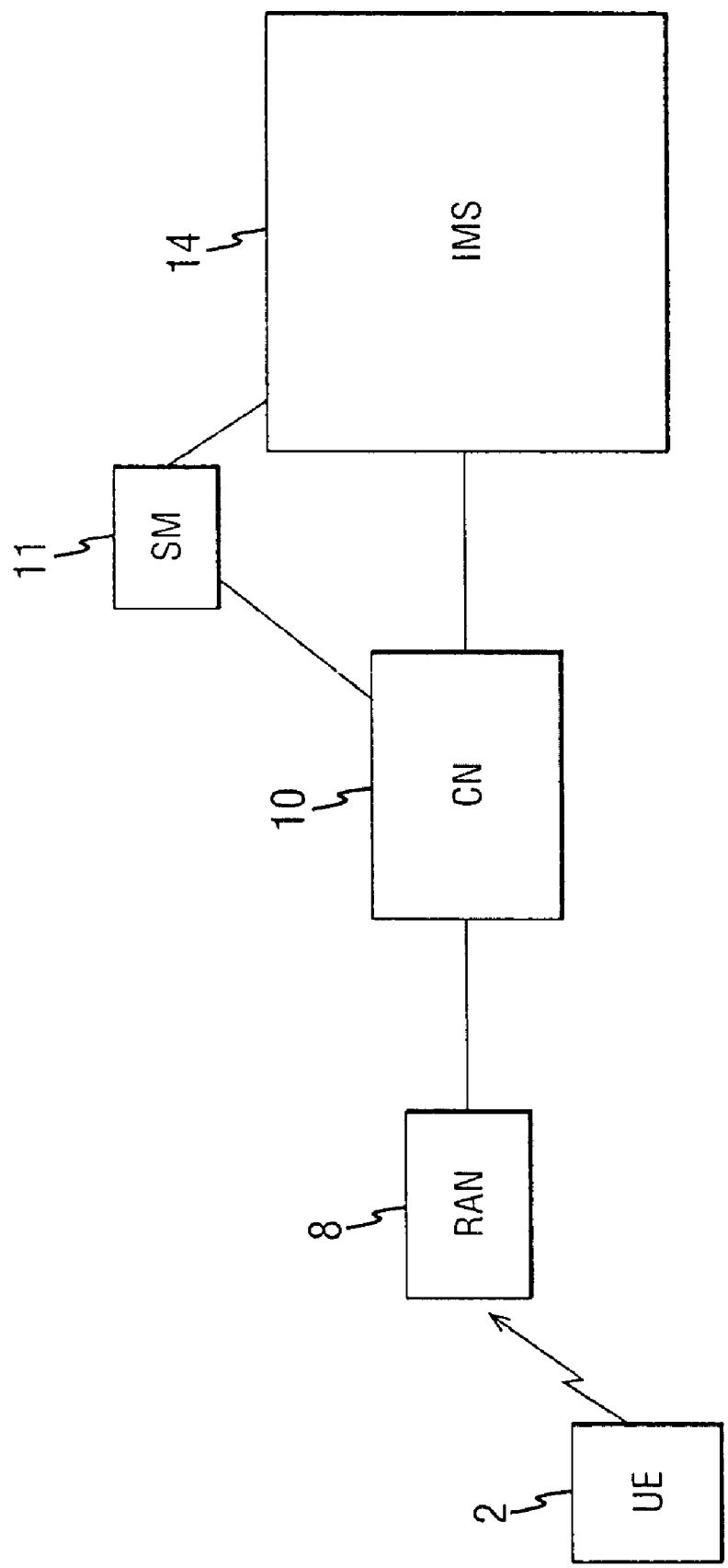
FIG. 1 shows a schematic system in which embodiments of the present invention can be implemented.

Reference is made to FIG. 1 which shows schematically a system in which embodiment of the invention can be implemented. The system comprises user equipment 2. The user equipment can take any suitable form and may for example be a mobile or a fixed entity such a mobile telephone, personal digital assistant (PDA), portable computer, laptop computer, fixed computer or any other suitable device. The user equipment 2 is arranged to communicate with a radio access network (RAN) 8 via a wireless connection. This wireless connection may be any suitable frequency such as for example a radio frequency.

The radio access network 8 generally consists of a base station entity (sometimes referred to as node B). For the purpose of this document, the term base station will be used and is intended to cover any suitable entity. The radio access network 8 also comprises a control element. The control element may be referred to as a radio network controller (RNC) in the case of a UMTS system or a base station controller BSC in the case of a GSM system. It is intended that the term controller cover any such control entity. In some arrangements, the control function is provided separately from the base station function and a single control entity may control a number of base stations. In other embodiments of the present invention, each base station may incorporate part of the control function. The radio access network is arranged to communicate with a core network 10. The core network 10 illustrated in FIG. 1 is a packet switched core network. Embodiments of the invention are also applicable to circuit switched core networks.

The core network comprises at least one serving GPRS (general packet radio service) support node SGSN which is used to switch the packet switched transactions and at least one gateway GPRS support node GGSN which are switches at the point that the core network 10 is connected to external packet switch networks. In this example, the core network is connected to an IM subsystem 14. This is shown separately but may in practice be part of the core network.

Also shown in FIG. 1 is a subscription manager SM 11. The SM 11 is shown as being connected to the core network and the IM subsystem.

Embodiments of the invention have a broad application to IMS services as well as other services such as value added services.

Embodiments of the present invention have been described particularly in the context of a third generation system. However, it should be appreciated that principals of the embodiments of the present invention can be applied to any other suitable communication systems.

The GUP has been developed to provide a conceptual description to enable harmonised usage of user related information located in different entities. The GUP is a collection of user related data which affects the way in which an individual user experiences services where a community of entities share this data. The GUP can be stored in the home network environment and additionally storage can be extended to the UE and/or value added service provider equipment. The GUP will be accessed by different stake holders and managed either by one (centralised) or by different stake holders (de-centralised) such as the user, subscriber, value added service provider and network operator by a standardised access mechanism. The GUP profile allows intra network usage, that is data exchange between applications within a mobile operator network, and inter network usage, that is between the mobile operator network and the value added service providers.

Figure 2:
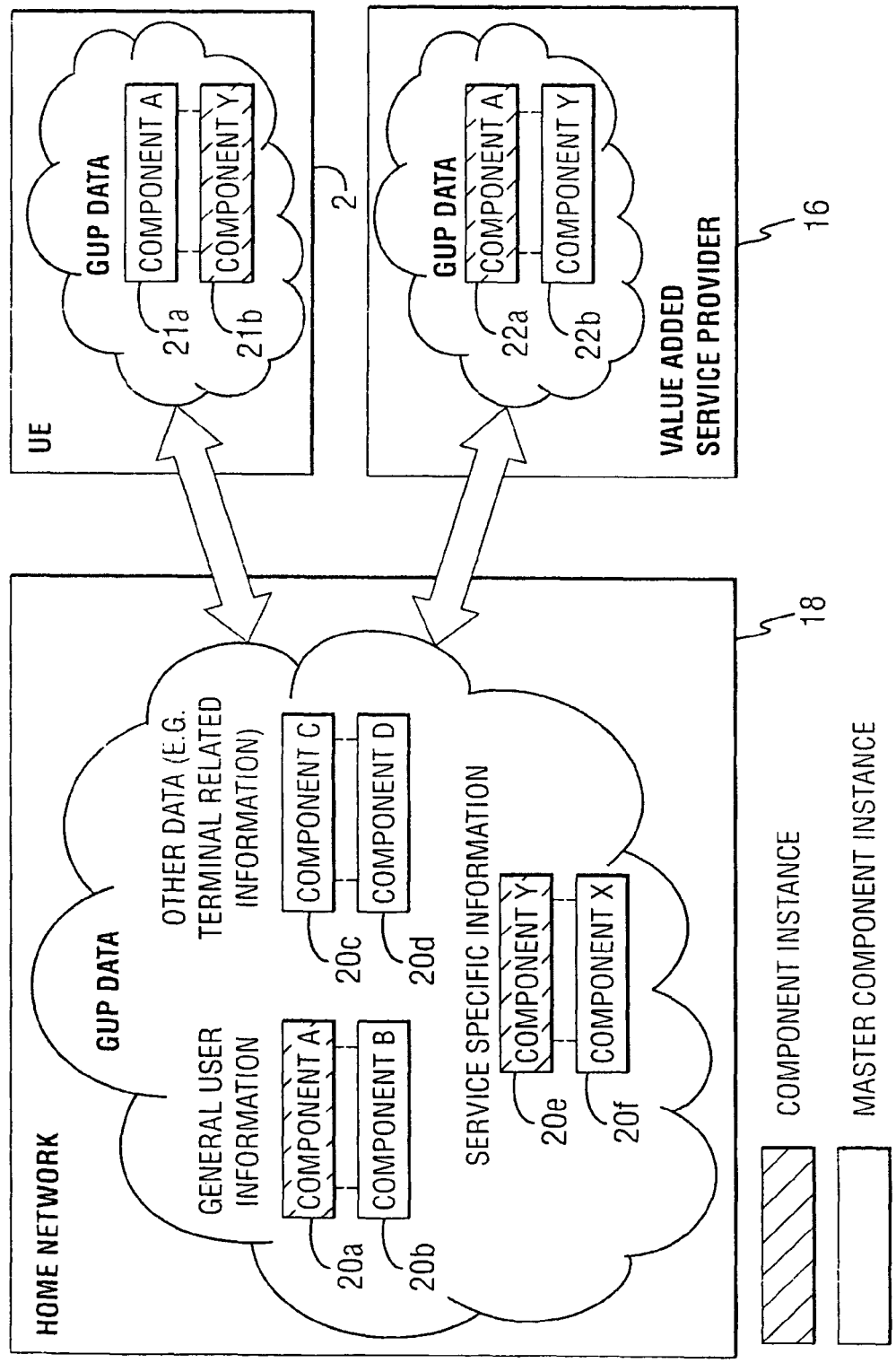
FIG. 2 shows a conceptual view of GUP.

Reference is made to FIG. 2 which shows the conceptual view of GUP. For each user characterised by an IMSI (international mobile subscriber identity) or IMS PID (public identity), one user profile exists. The user profile may consist of several "components" 20, 21 or 22. As shown in FIG. 2, the components 21a and 21b are provided in the user equipment. Components 22a and 22b are provided in the value added service provider 16. The value added service provider 16 may be for example be part of the IMS system 14 or separate therefore. Components 20a-f are provided in the home network. The home network 18 corresponds generally to the core network 10 shown in FIG. 1, although it may also incorporate the RAN 8 in some embodiments of the invention. Thus, within the home network, the components may be distributed in various network nodes.

The components may comprise general user information such as components 20a and 20b, 21a and 22a. The data may also include service specific information such as components 20c, 20f, 21b and 22b. The data may also include other components such as for example terminal related information such as components 20c and 20d. In the arrangement shown in FIG. 2, one master of the component exists but one or more copies of the master component may exist. For example, component 21a is a master component and this is copied as component 20a in the home network 18 and component 22a in the value added service provider 16. Components 20b, 20c and 20d are all master components. Component 22b is a master component with components 20c in the home network 16 and component 21b in the user equipment 2 being copies thereof. Component 20f is also a master component. In embodiments of the present invention the home operator is able to copy master components, which are located outside the home network to the home network. Within the home network, functionality exists that is able to locate GUP components to thereby make applications unaware of the actual location of the components.

Figure 3:
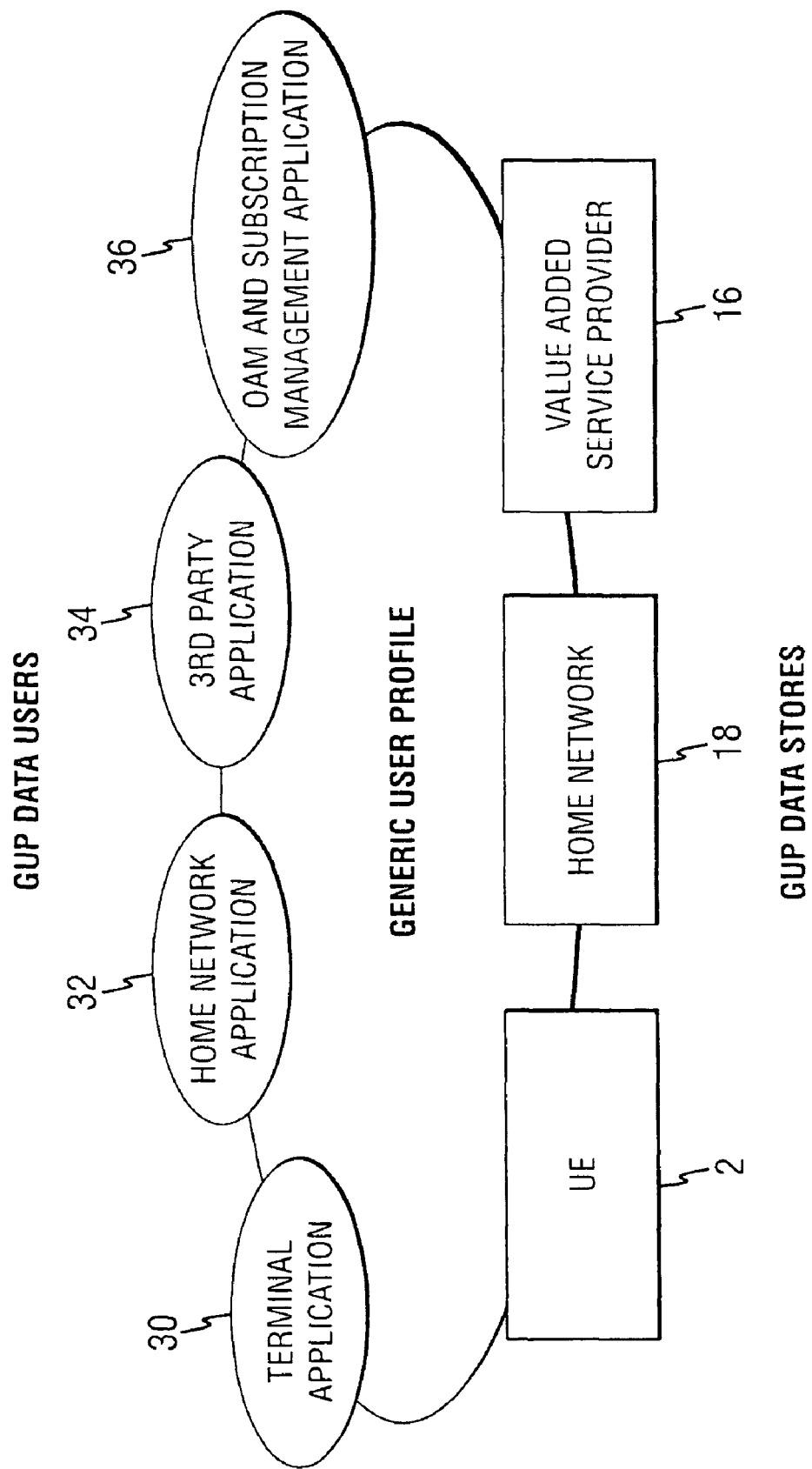
FIG. 3 illustrates the scope of GUP.

Reference is now made to FIG. 3 which shows the entities involved in the handling of the GUP. The GUP provides a generic mechanism to access and manipulate user related data for suppliers and consumers. With this mechanism, data can be retrieved and managed in a harmonised way.

The suppliers and consumers of the data can be divided into the following groups: applications 30 in the UE 2; home network applications 32 in the home network 18; third party applications 34 in for example value added service providers 16; and OAM (operational administration and maintenance) and subscription management applications 36. The terminal applications 30 are varying in nature and can supply both GUP data to the above mentioned data stores and retrieve the data for use in the application. Applications 32 in the home network may include those related to call or session handling as well as messaging or web services. Third party applications 34 are similar to the application in the home network. OAM and subscription management applications provide for administration of user data by the network operator.

Figure 4:
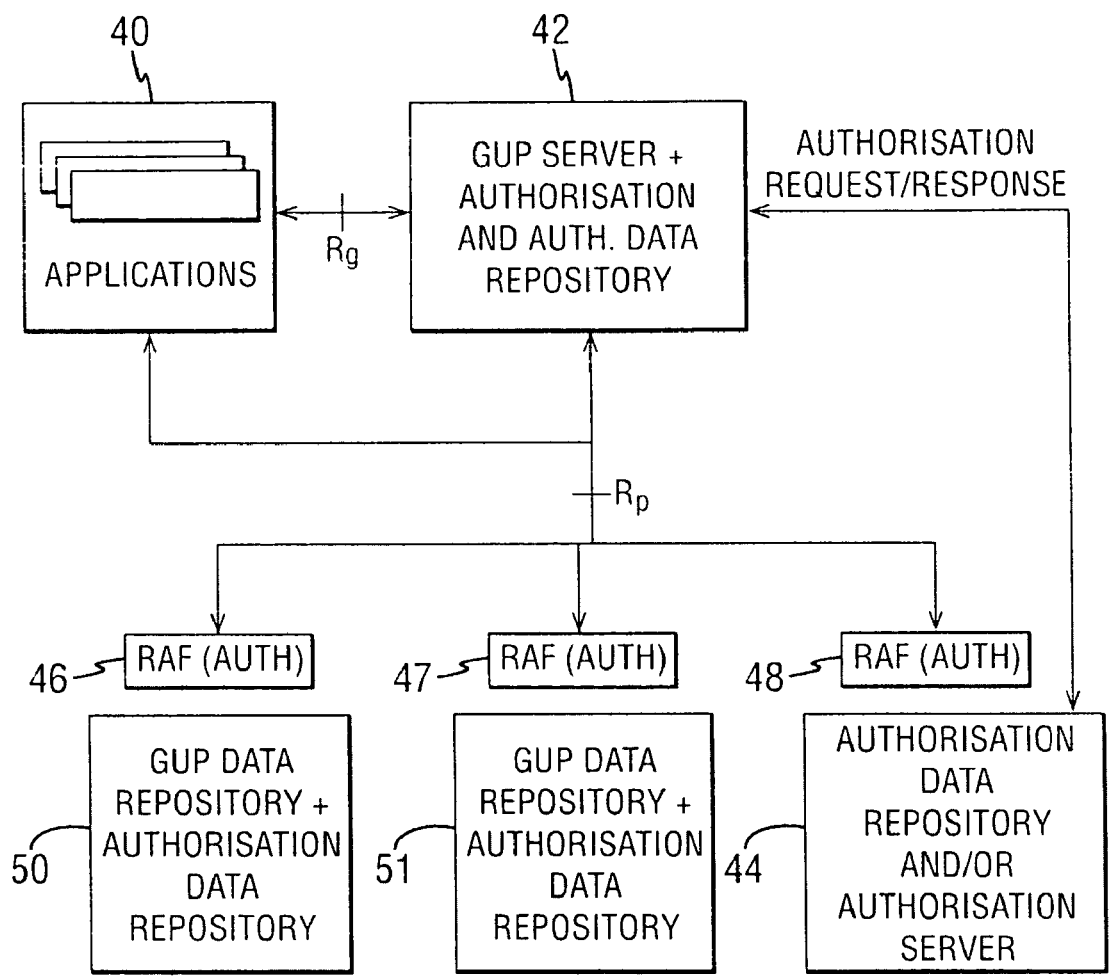
FIG. 4 shows the GUP reference architecture incorporating embodiments of the present invention.

Reference is now made to FIG. 4 which shows an example of a GUP reference architecture incorporating embodiments of the present invention. The applications 40 (including terminal applications 30, home network applications 32, third party applications 34 and OAM and subscription management applications 36) are connected to a GUP server 42. The GUP server is a functional entity providing a single point of access to the GUP data of a particular subscriber. In the arrangement shown in FIG. 4 there is separate authorisation server and/or authorisation data repository 44.

Embodiments of the present invention can be implemented in two different ways. In one implementation, server 44 is omitted. The GUP server 42 will additionally provide the authorisation server functionality. The authorisation data repository may be in the server 42 or a separate data repository. In an alternative embodiment of the invention, as illustrated in FIG. 4, there is a separate server which provides the authorisation server function and/or is the authorisation data repository. In other words, authorisation decisions can be made by server 44 or entity 44 may simple be a repository for authorisation related data.

Also shown in FIG. 4 are repository access functions 46, 47 and 48. The repository access function RAF realises a harmonised access interface. It hides the implementation details of the data repositories from the GUP infrastructure. The RAF performs protocol and data transformation where needed. Associated with each RAF 46 and 47 is a data repository 50 and 52 respectively. RAF 48 is associated with the server or entity 44. The data repository stores the primary master copy of one or several GUP profile components. The RAF associated with a particular data repository provides for the standardised access to the data repository. In the arrangement shown in FIG. 4, the data repositories and associated RAF's store the authorisation data. The authorisation data can be provided to the server 42 or any other suitable entity. For example the data may be provided to applications which have to be authorised by some means to provide operator applications that may access the authorisation data. Other data may be included in the same data repositories as the authorisation data as will be discussed later.

In the embodiment shown in FIG. 4, an authorisation request may be sent from the GUP server 42 directly to entity or server 44 which may send a response thereto back to the GUP server. This may bypass RAF 48.

Figure 5:
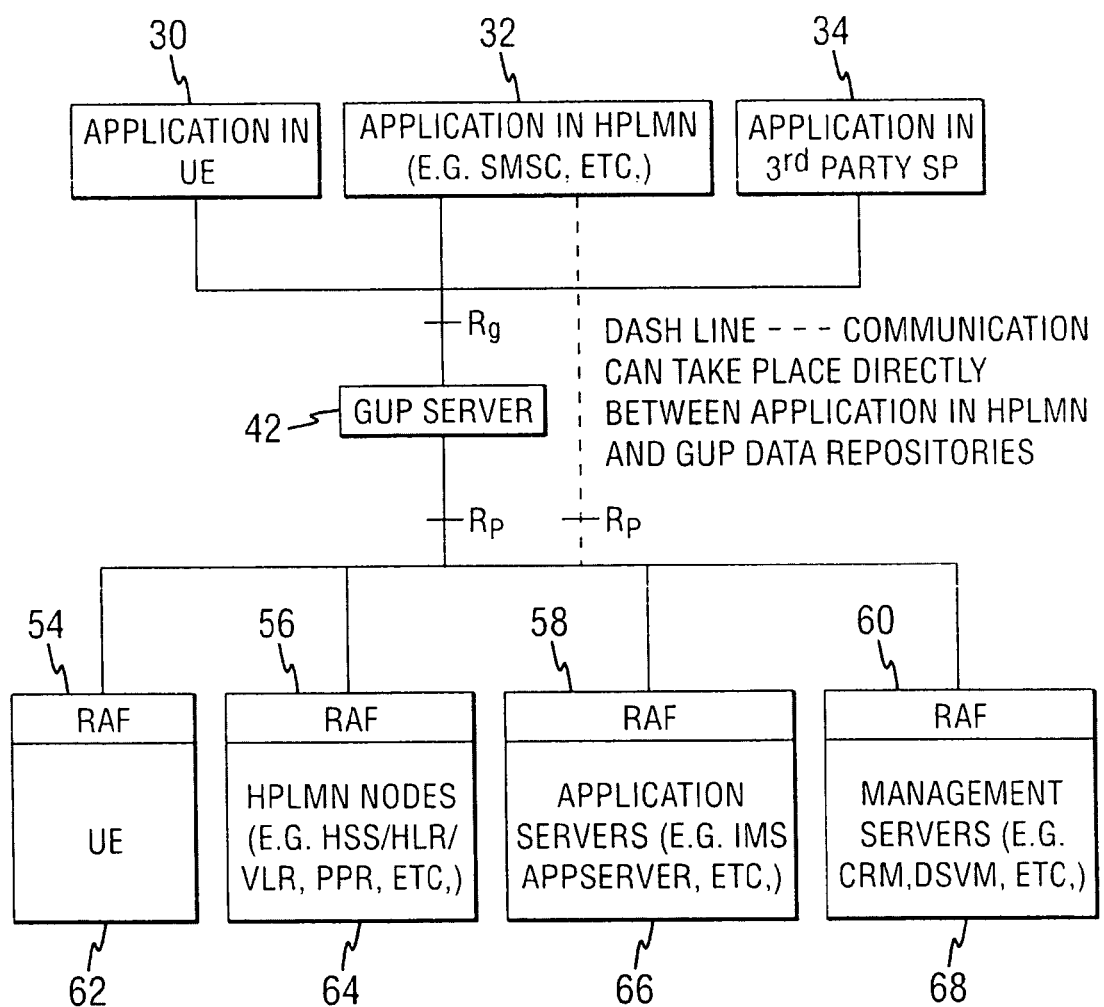
FIG. 5 shows an example of mapping of the GUP reference architecture to the current infrastructure environment, incorporating embodiments of the present invention.

Reference is made to FIG. 5 which shows an example of the mapping of the GUP reference architecture of FIG. 4 to the current infrastructure environment. The applications 30, 32 and 34 are shown each of which has a connection to the GUP server 42. Depending on the embodiment of the invention, the GUP server may be connected to the authorisation server and/or authorisation data repository 44 of FIG. 4.

The RAF 54, 56, 58 and 60 are as follows:
RAF 54 provides access to a data repository for the user equipment 62;
RAF 56 provides access to a data repository 64 for the HPLMN nodes (home PLMN) such as the HSS (home subscription server), HLR (home location register), VLR (visit location register) PPR (privacy profile register);
RAF 58 provides access to the data repository 66 for the application servers for example an IMS application server or the like;
RAF 60 provides access to a data repository 68 for the management servers CRM (customer relationship management) or the like. In one or more of these data repositories 62 to 68, authorisation data may be stored.

Figure 6:
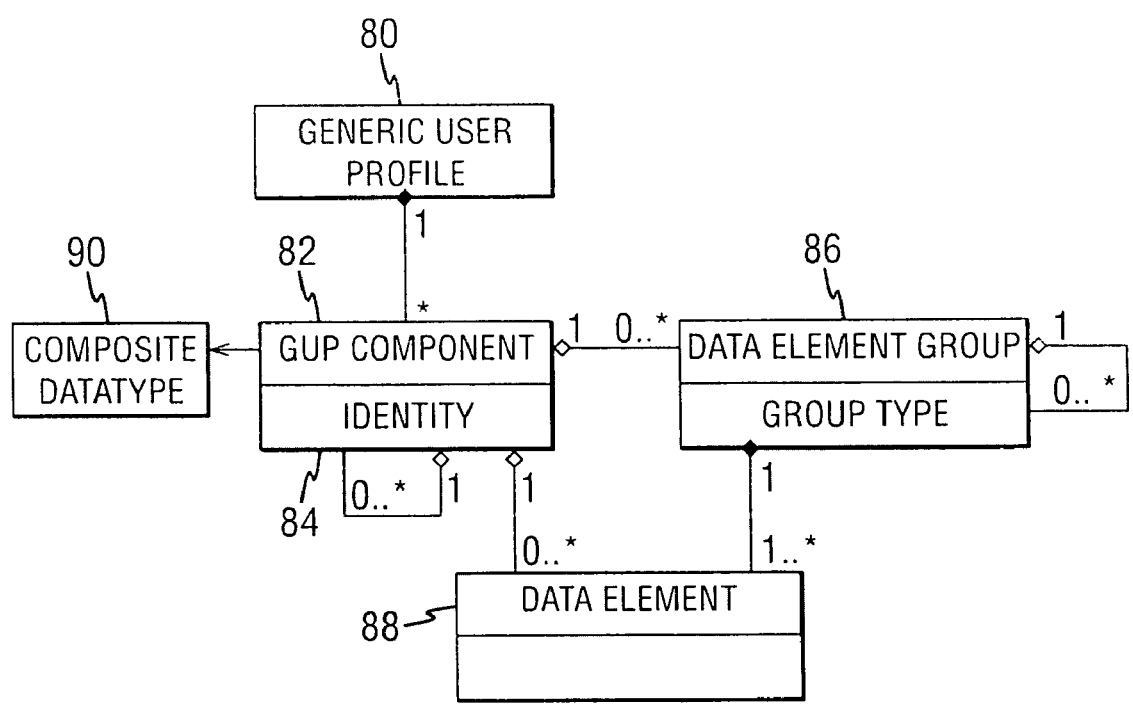
FIG. 6 shows the basic structure of GUP.

Reference is now made to FIG. 6 which shows the GUP information model.

A generic user profile 80 contains a number of independent GUP components 82. A GUP component may contain, that is reference, other GUP components. This for example allows the reuse of data. The GUP component 82 has a unique identity within the generic user profile and it can be retrieved through one RAF. In addition to the component type, the component identity contains either a subscriber identity or more generic identification depending on which kind of component is in question. A GUP component may consist of a number of GUP components, data element groups and/or data elements.

A GUP component contains zero or more data element groups 86. The data element group contains indivisible data elements and or data element groups. The necessary data elements group allows deeper hierarchical structures. The data element group in the lowest hierarchical level contains one or more data elements 88. The data element groups inside a GUP component may be the same or different types. In some embodiments of the invention, the GUP component may contain zero or more data elements without the data elements groups. A GUP component shall have at least one GUP component, data element group or data element.

A composite data type 90 is used to define the structure of the whole GUP component. The structure includes a definition of about what kind of data element groups and/or which data elements belong to the defined GUP component as well as the data types and valid values of the data.

Figure 7:
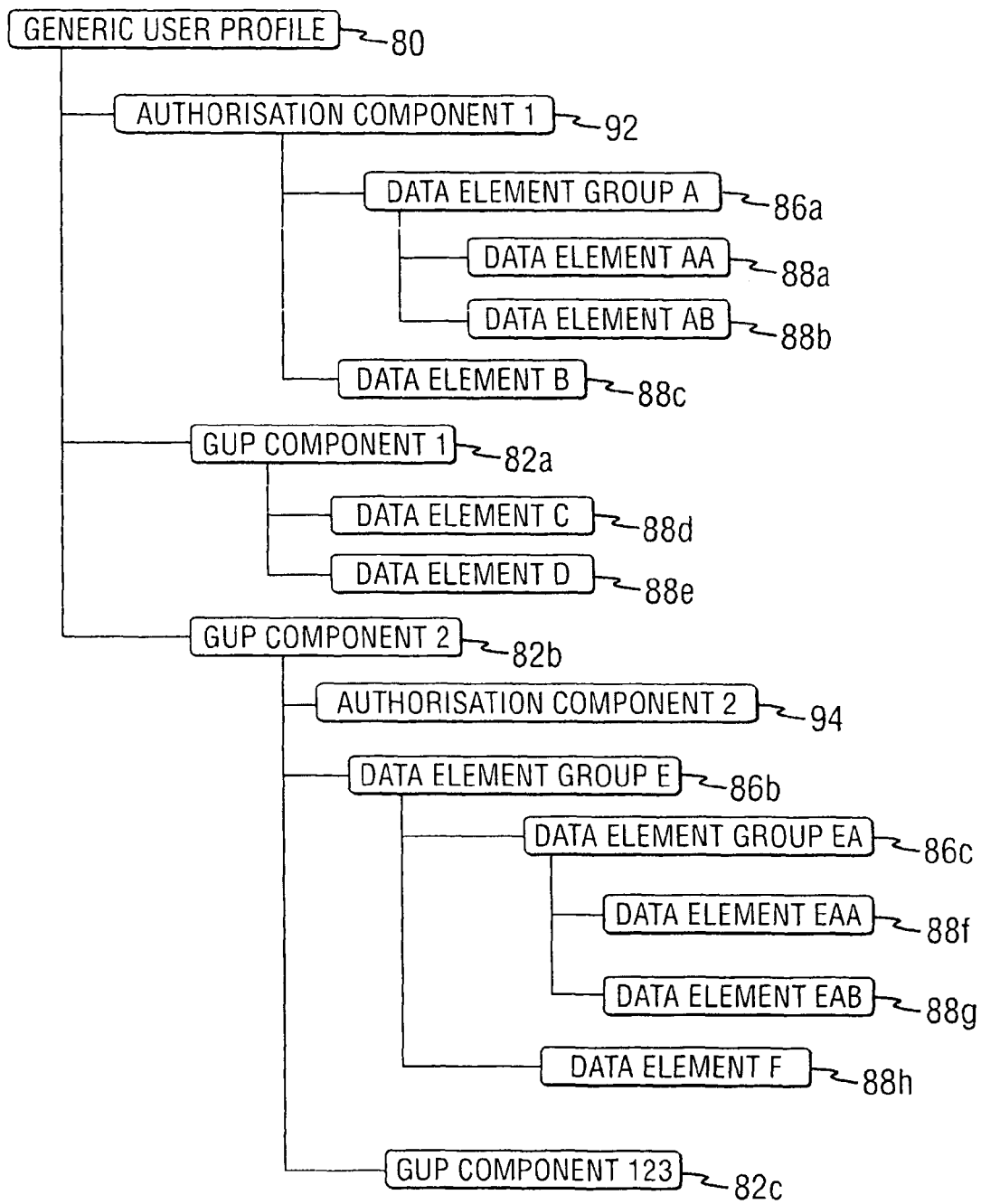
FIG. 7 shows examples of the placement of authorisation data components in the generic user profile, in embodiments of the present invention.

Reference is now made to FIG. 7 which shows how the authorisation component can be fitted into the generic user profile. The generic user profile 80 is shown as having an authorisation component 92 (which is a GUP component), a first GUP component 82a and a second GUP component 82b. The authorisation component 92 may comprise a data element group 86 comprising first and second data elements 88a and 88b. Alternatively, the authorisation component may comprise a data element 88c.

The second GUP component 82a is shown as comprising two data elements 88d and 88e.

The second GUP component is shown as having an authorisation component 94. This authorisation component has a data element group or a data element. Also shown is a data element group 86b. The data element group 86b comprises a data element group 86c which in turn comprises two data elements 88f and 88g. Alternatively or additionally, the data element group 86b may comprise a data element 88h. The GUP component 82b has also shown as comprising a further GUP component 82c. In other words, the authorisation component introduced by embodiments of the present invention may contain a GUP component, a data element group and/or a data element.

The authorisation data of the GUP is considered to be a separate GUP component that can be referenced by the user profile data or by a GUP component. This allows the same capabilities to be used for managing the authorisation data as for other user profile data. The authorisation data is fully separated from the data itself and the authorisation model and rules may independently develop. In embodiments of the present invention, it is possible to reference any GUP data items (e.g. subscriber's language or preferences to receive push type of communication) in the authorisation data and give permissions for its use. The rules may be coarse or fine grained, only the necessary level of detail may be provided.

The authorisation data model used in embodiment of the present invention allows for the providing of authorisation data for complex user profile information. This is needed when for example deciding if an item of data can be given when requested by some entity. The authorisation may be done in very different granularity and different implementations and configurations. Embodiments of the present invention are able to support these alternatives.

Embodiments of the present invention have the advantages: a generic and common solution for different data to be authorised can be adopted. It is suitable for different kinds of implementations and implementation architectures. The management of authorisation data can be handled by the GUP, as for other GUP specific data and separately from the data to be authorised. It is easy to grant different access rights to different entities for managing authorisation data versus managing the actual data to be authorised. Similar user interfaces and management applications can be used as for other GUP data. Embodiments of the present invention are data independent, that is there is no need to change the existing data formats or structures of data storage because of the authorisation data. The same authorisation settings can be utilised for different data.

Embodiments of the present invention may also be location independent. They can reside in a separate server dedicated for storing authorisation data, within the data to be authorised, or in a server which handles authorisation on behalf of the actual data storage.

As mentioned previously, the authorisation data model for GUP is such that the authorisation related data is seen as a separate GUP component referred to as authorisation component. It is similar to any other GUP component used either for describing the actual user profile data or actual generic data.

In embodiments of the present invention, the same mechanisms, that is the same procedures as create, modify, remove, query, similar component identifiers, and the same management interfaces can be used for managing the authorisation data as for other user profile data. This also allows the user data to be seen as part of the whole user profile depending on the case.

As mentioned previously, the authorisation data is not tightly coupled with the authorised data. The authorisation data may reside in any location, for example in a separate privacy register or within the data storage or in the GUP server depending on the implementation requirements. The authorisation component allows the authorisation data to be defined to be user specific or common to a number of users. The authorisation component allows the authorisation data to be common to the components of the whole user profile or common to all users of a certain component type.

The authorisation component can be used to describe authorisation rules for the authorisation data itself, that is who is allowed to alter the authorisation rules. The authorisation component can be used to describe data distribution and usage policy such as retention time, further disclosure rules or the like, to be conveyed with the actual data to the requester of the data. The authorisation component can describe default authorisation setting if no (or before) user specific settings exist.

The following types of authorisation data can be specified:
identity of the target subscriber (or a group of subscribers)—the GUP subscriber component type and more detailed data references
identities of the requestor (application ID and end-user ID) or group of requestors
other requestor related data received in the request as the Authorisation Assertions allowed operations (Query, Modify, Create, Delete, Subscribe)
privacy policy specific attributes (the privacy policy is included in the request)
other attributes (as e.g. the time schedule) related to the request case.
actions (e.g. the decision, encapsulation of the privacy policy)

The authorisation component is able to reference any element in the GUP information model. This allows authorisation settings to different levels and the data hierarchy depending on the case and need. Thus in embodiments of the invention, the GUP defines an Authorization Component which is just like any other GUP Component. This implies that the same capabilities as for any GUP Component (e.g., identities and structure) are also applied to the Authorization Component. The Authorization Component is able to reference any element of the GUP Information Model and define the authorization regarding those elements. The Authorization Component may be either subscriber specific or common to several subscribers and/or elements of the GUP Information Model. Note that any GUP Component may include additional data items which are used (e.g., by RAF) for the authorization purposes but those are seen as a part of the data specific to a certain GUP Component, and thus not a part of the generic authorization specified by GUP.

In embodiments of the invention, GUP functionality exists that is responsible to authorize applications to access GUP data based on user specific or common privacy rules. All attempts to access the GUP data are to be authorized according to the defined policies which shall include the requestor information, the requested data, the target subscriber and the performed operation, or some of those.

The GUP data structures need to satisfy the requirement to provide the authorization information on the different levels: profile, component or data element. In addition to the generic authorization data, additional service specific data may be defined (e.g. for LCS). The same applies for the authorization decision logic. The execution of the authorization logic leads to a decision whether a requestor is allowed to make the request at all, and additionally to which part of data the requestor has the appropriate access rights with regard to the nature of the request. GUP provides mechanisms for the different GUP entities for managing the authorization data.

Both HPLMN based applications and non-HPLMN based applications are expected to send requests to the GUP Server. The GUP server shall have functionality to apply different authorization criteria, policy control and load control to HPLMN and non-HPLMN applications.

In addition to the authorisation component, any GUP component representing the actual profile data may have additionally data items within the data which are to be used e.g. locally by the RAF, for the authorisation purposes but those are seen as part of the data specific to a certain GUP component. These authorisation settings can be interpreted only by the entities which have a good knowledge of the semantics of the data. For example a particular service profile data (in one GUP Component) could have an address (e.g. URL) defined in its data and also an access control field to show how this address may be accessed or distributed. The handling of this special privacy field is specific to this particular service and cannot be handled by the generic GUP functions, thus the decisions based on this access control parameter must be made close to the repository that provides this service.

As shown in FIG. 2, the GUP server may contain user's specific or common authorisation components that are referenced in the user's profile. The GUP server makes the authorisation decisions based on the authorisation component.

Alternatively or additionally, the RAF function and data repository can act similarly as a GUP server but based on the authorisation component referenced to a GUP component that is handled by the RAF.

Alternatively or additionally the RAF and/or GUP server are capable of accessing the authorisation component related to a GUP request. The authorisation component may reside either in the GUP server, GUP data repository or in a separate server dedicated to the authorisation. The GUP server takes care of the authorisation based on the authorisation component and the RAF takes care of the authorisation locally within the related data repository.

Also RAF may authorise based on an authorisation component (component discussed later).

Authorisation data may be manipulated similarly as with other GUP components and the authorisation itself is normally an internal function in the GUP Server or RAF, if there is a separate authorisation server then an authorisation request and corresponding response messages can be sent between GUP Server and authorisation server.

Reference is now made to FIG. 8 which shows one example of the signalling in an embodiment of the present invention which uses an authorisation server.

In step S1, an application 40 sends a GUP request S1 to the GUP server 42. The GUP server 42 will authenticate the application.

In step S2, the GUP server will send an authorisation request to the authorisation server 44. This will be via the direct connection shown in FIG. 4. In step S3, the authorisation server 44 sends, along the same connection, an authorisation response.

In step S5, the GUP server 42 will then request a GUP data element from the appropriate RAF, which may be any of the RAF's shown in FIG. 4 (or indeed in FIG. 5). The associated RAF will return the GUP data element in step S6 to the GUP server 42. It should be appreciated that the RAF obtains the requested GUP data element from the associated GUP data repository. The RAF will thus request the appropriate data element from the GUP data repository and GUP data repository will return the GUP data element requested to the RAF. This is not shown in FIG. 8 but would take place between steps S5 and S6.

In embodiments of the present invention, where more than one data element is required, the required data elements will be requested sequentially.

In step S7, the GUP server 42 delivers the requested GUP data. This may involve the GUP server composing the GUP component from the obtained data elements.

It should be appreciated that in some embodiments of the present invention, the function provided by the authorisation server 44 may be provided by the GUP server or any other appropriate entity.

Embodiments of the invention may thus have a component deep in the profile structure, for example a component may refer to a component which may refer again to a still lower component (possibly and so on) which contains or refers to an authorisation component, not necessarily but optionally if required.

The invention claimed is:

1. A method comprising:
   sending to at least one of a plurality of repository access functions, by the generic user profile server, a request for a generic user profile data, said generic user profile data comprising a plurality of parts, at least one of the plurality of parts comprising one or more of a data component, a data group, and a data element, wherein authorization data referencing the generic user profile data is one of the plurality of parts of said generic user profile data, wherein the authorization data is independent of the at least one of the plurality of parts, wherein the authorization data is common to a plurality of users of a certain part of a profile, and wherein each of the plurality of repository access functions is configured to access a different portion of the generic user profile data stored in a respective one of a plurality of repositories;
   receiving from the at least one of the plurality of repository access functions, at the generic user profile server, a response comprising said generic user profile data to which a requestor has authorized access rights, the authorization being defined on the basis of the authorization data stored in at least one of the plurality of repositories accessed by the respective ones of the plurality of repository access functions; and
   sending to the requestor, by the generic user profile server, said generic user profile data after receiving the response comprising said generic user profile data.

2. A method as claimed in claim 1, wherein the at least one of the plurality of parts and said authorization data are parts of a common data structure.

3. A method as claimed in claim 1, wherein the authorizing data comprises defining access to said other plurality of parts with said authorization data.

4. A method as claimed in claim 1, wherein said authorization data comprises at least one of
   rules for said authorization data,
   data distribution information,
   usage information, and
   default information.

5. A method as claimed in claim 1, wherein said authorization data comprises data that is user specific or common to a plurality of users.

6. A method as claimed in claim 1, further comprising
   arranging said authorization data to reference at least one element of a generic user profile information model.

7. A method as claimed in claim 1, wherein said authorizing comprises taking into account at least one of a requestor, requested data, a target subscriber, and an operation to be performed.

8. A method as claimed in claim 1, further comprising
   obtaining said authorization data from at least one of a separate privacy register, a user profile server, a separate server, and a data storage.

9. A method as claimed in claim 1, wherein said authorization data is common to all components of a profile for a user.

10. An apparatus, comprising:
a sender configured on a generic user profile server to send a request for a generic user profile data to at least one of a plurality of repository access functions, said generic user profile data comprising a plurality of parts, at least one of the plurality of parts comprising one or more of a data component, a data group, and a data element, wherein authorization data referencing the generic user profile data is one of the plurality of parts of said generic user profile data, the sender further configured to send said generic user profile data to a requestor after receiving the response comprising said generic user profile data, wherein each of the plurality of repository access functions is configured to access a different portion of the generic user profile data stored in a respective one of a plurality of repositories; and
a receiver configured on the generic user profile server to receive a response from the at least one of the plurality of repository access functions comprising said generic user profile data to which the requestor has authorized access rights, the authorization being defined on the basis of the authorization data stored in at least one of the plurality of repositories accessed by the respective ones of the plurality of repository access functions;
wherein the authorization data is independent of the at least one of the plurality of parts, and wherein the authorization data is common to a plurality of users of a certain part of a profile.

11. An apparatus as claimed in claim 10, wherein said apparatus comprises an application a server or a user equipment.

12. A system comprising:
at least one application; and
at least one generic user profile server comprising:
a receiver configured to receive a request from the application relating to generic user profile data;
a processor configured to access authorization data via at least one of a plurality of repository access functions, reference the generic user profile data, said generic user profile data comprising a plurality of parts, the parts being one or more of a data component, data group and data element, wherein each of the plurality of repository access functions is configured to access a different portion of the generic user profile data stored in a respective one of a plurality of repositories;
wherein the authorization data is one of the plurality of parts of the generic user profile data, wherein the authorization data is independent of the at least one of the plurality of parts, and wherein the authorization data is common to a plurality of users of a certain part of a profile; and
a processor configured to authorize access to a requestor of one or more parts of the generic user profile data in accordance with the authorization data, and send a response to the application including data relating to the parts of the generic user profile data the requestor is authorized to access, the authorization being defined on the basis of the authorization data stored in at least one of the plurality of repositories accessed by the respective ones of the plurality of repository access functions.

13. A system as claimed in claim 12, wherein said at least one application is provided on at least one of
at least one user equipment,
at least one third party server, and
a home network.

14. A system as claimed in claim 12, wherein said at least one server comprises at least one of a generic user profile server and an authorization server.

15. An apparatus, comprising:
sending means for sending to at least one of a plurality of repository access functions a request for a generic user profile data, said generic user profile data comprising a plurality of parts, at least one of the plurality of parts comprising one or more of a data component, a data group, and a data element, wherein authorization data referencing the generic user profile data is one of the plurality of parts of said generic user profile data, wherein the authorization data is independent of the at least one of the plurality of parts, wherein the authorization data is common to a plurality of users of a certain part of a profile, and wherein each of the plurality of repository access functions is configured to access a different portion of the generic user profile data stored in a respective one of a plurality of repositories;
receiving means for receiving from the at least one of the plurality of repository access functions a response comprising said generic user profile data to which a requestor has authorized access rights, the authorization being defined on the basis of the authorization data stored in at least one of the plurality of repositories accessed by the respective ones of the plurality of repository access functions; and
sending means for sending said generic user profile data after receiving the response comprising said generic user profile data.

* * * * *